US005897070A

United States Patent [19]

Kojima

[11] Patent Number: 5,897,070

[45] Date of Patent: Apr. 27, 1999

[54] AUTOMATIC FILM UNLOADING APPARATUS AND INTERMEDIATE FILM TAKEUP CARTRIDGE OF AUTOMATIC FILM DEVELOPING APPARATUS

[75] Inventor: Masayuki Kojima, Wakayama, Japan

[73] Assignee: Noritsu Koki Co., Ltd., Wakayama, Japan

[21] Appl. No.: 08/712,848

[22] Filed: Sep. 12, 1996

[30] Foreign Application Priority Data

Sep. 18, 1995 [JP] Japan .................................... 7-238578
Dec. 8, 1995 [JP] Japan .................................... 7-320692

[51] Int. Cl.[6] ........................................ G03B 1/58
[52] U.S. Cl. .................................. 242/332.7; 242/532.7
[58] Field of Search ............................ 242/332, 332.4, 242/332.7, 332.8, 337, 532.7, 533.4, 532.5

[56] References Cited

U.S. PATENT DOCUMENTS 2,973,158 2/1961 Zernov ............................ 242/533.4 X
5,632,452 5/1997 Takahashi et al. ............... 242/332.8 X

FOREIGN PATENT DOCUMENTS 0 624 822 11/1994 European Pat. Off. .
0 628 873 12/1994 European Pat. Off. .
0 660 163 6/1995 European Pat. Off. .
2 128 593 5/1984 United Kingdom .

*Primary Examiner*—John Q. Nguyen
*Attorney, Agent, or Firm*—Wenderoth, Lind & Ponack, L.L.P.

[57] ABSTRACT

An automatic film unloading apparatus permits an undeveloped film to be automatically unloaded from its cartridge, rewound correctly in a case within a short period of time, and moved to a location where it is joined to a film leader. An intermediate film takeup cartridge for use in the automatic film developer apparatus includes an intermediate cartridge body including a film takeup roller and a base which can easily be separated from each other. When the entire length of an undeveloped film is rewound on the film takeup roller or the undeveloped film is jammed, the intermediate cartridge body is readily separated from the base, hence allowing the taken up or jammed undeveloped film to be removed from the film takeup roller with ease.

5 Claims, 5 Drawing Sheets

AUTOMATIC FILM UNLOADING APPARATUS AND INTERMEDIATE FILM TAKEUP CARTRIDGE OF AUTOMATIC FILM DEVELOPING APPARATUS

BACKGROUND OF THE INVENTION

The present invention relates to an automatic film unloading apparatus for automatically unloading an undeveloped film from its film cartridge and feeding it to a location where it is joined to a film leader for further photographic development processing, and to an intermediate film takeup cartridge for temporarily storing an undeveloped film unloaded from its film cartridge before being subjecting to development.

A film cartridge loaded with undeveloped film of 110, 120, or 126 type is not accepted for direct installation in a photographic film developer machine for development. It is thus a common operation in a dark room or pouch that each undeveloped film is unloaded from its cartridge and rewound into another cartridge (or a specific patrone) so that its trailing end is joined with a film leader.

In an automatic film developer apparatus for development of photographic films of a newly introduced APS type, an undeveloped APS film is unloaded from its cartridge and rewound into an intermediate cartridge for temporary storage. Then, the undeveloped film is automatically fed out from the intermediate cartridge and subjected to the development process in the automatic film developer apparatus.

In the former operation, any undeveloped film of a traditional size has to be manually rewound into the cartridge in a dark room or pouch and it often may be set upside down. Also, such manual rewinding will take a considerable amount of time.

In the latter operation, the intermediate cartridge for the undeveloped APS films consists of a single shell which is not separated into two and is fixedly mounted at a given location in an automatic film developer apparatus. If the entire length of an undeveloped film is taken up in the intermediate cartridge, the film cannot be pulled back. When the undeveloped film is jammed in the intermediate cartridge, it must be withdrawn manually in a dark room or pouch. This may result in accidental exposure of the undeveloped film to light or damaging the undeveloped film.

The present invention has been invented in view of the above circumstances and its object is to provide an automatic film unloading apparatus capable of automatically unloading and rewinding an undeveloped film from and to its cartridge within a shorter period of time but without rewinding in a wrong orientation, and registering its trailing end to a location where it is joined with a film leader. It is another object of the present invention to provide an intermediate film takeup cartridge for use in an automatic film developer apparatus which allows an undeveloped film to be rewound on a film takeup roller thereof to a not excessive degree and if jammed, to be withdrawn without physical injury.

SUMMARY OF THE INVENTION

For achievement of the above objects of the present invention, the following improvements are implemented. An automatic film unloading apparatus according to the present invention includes a film unloading assembly or means for rotating the spool of a film cartridge loaded with a roll of undeveloped film, an assembly or means for opening and closing a light shielding door of the film cartridge, a film disconnecting assembly or means for disconnecting the trailing end of the undeveloped film from the spool when unloading, cases or cartridges for storing the undeveloped films unloaded from their respective film cartridges, a takeup reel rotating means for rotating assembly or a takeup reel of each case, a case turning assembly or means for moving the cases to a predetermined location, and a film feeding means for feeding out the undeveloped film from the takeup reel of the case.

An intermediate film takeup cartridge for use in an automatic film developer apparatus which allows an undeveloped film to be automatically unloaded from its film cartridge and rewound in the intermediate cartridge before being delivered from the intermediate cartridge to a development station includes an intermediate cartridge body including a film takeup roller, a film guide passage extending along the outer surface of the film takeup roller, and a guide member for guiding the undeveloped film. A base including a film introduction passage communicated with the film guide passage and a guide member for guiding the undeveloped film to be rewound on the film takeup roller is arranged for easy joining to and separating from the body.

DETAILED DESCRIPTION OF THE PREFERRED EMBODIMENTS

Embodiment 1

Embodiments of the present invention will be described referring to the accompanying drawings.

Figure 1:
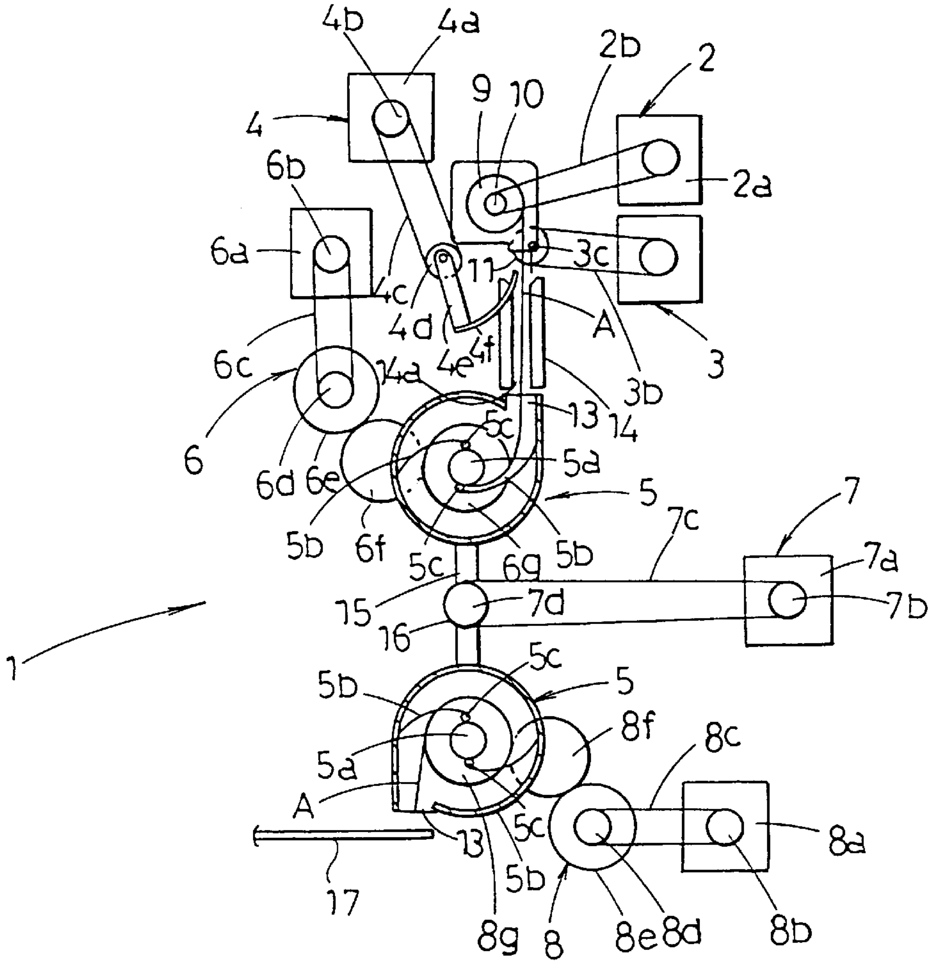
FIG. 1 is a schematic explanatory view showing the entire construction of an automatic film unloading apparatus of the present invention.
Figure 2:
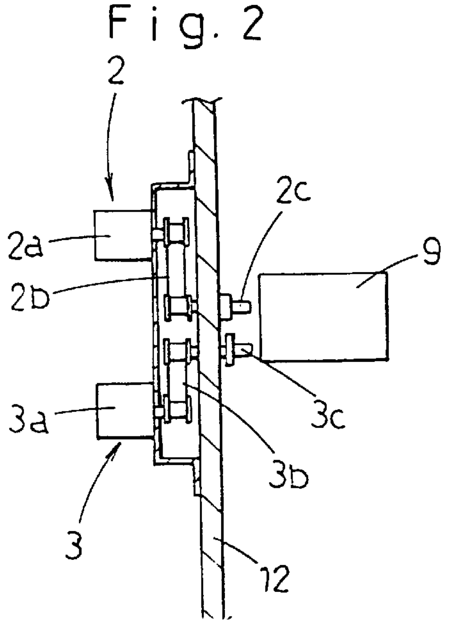
FIG. 2 is an explanatory view showing a film unloading means and a light shielding door opening and closing means.
Figure 3:
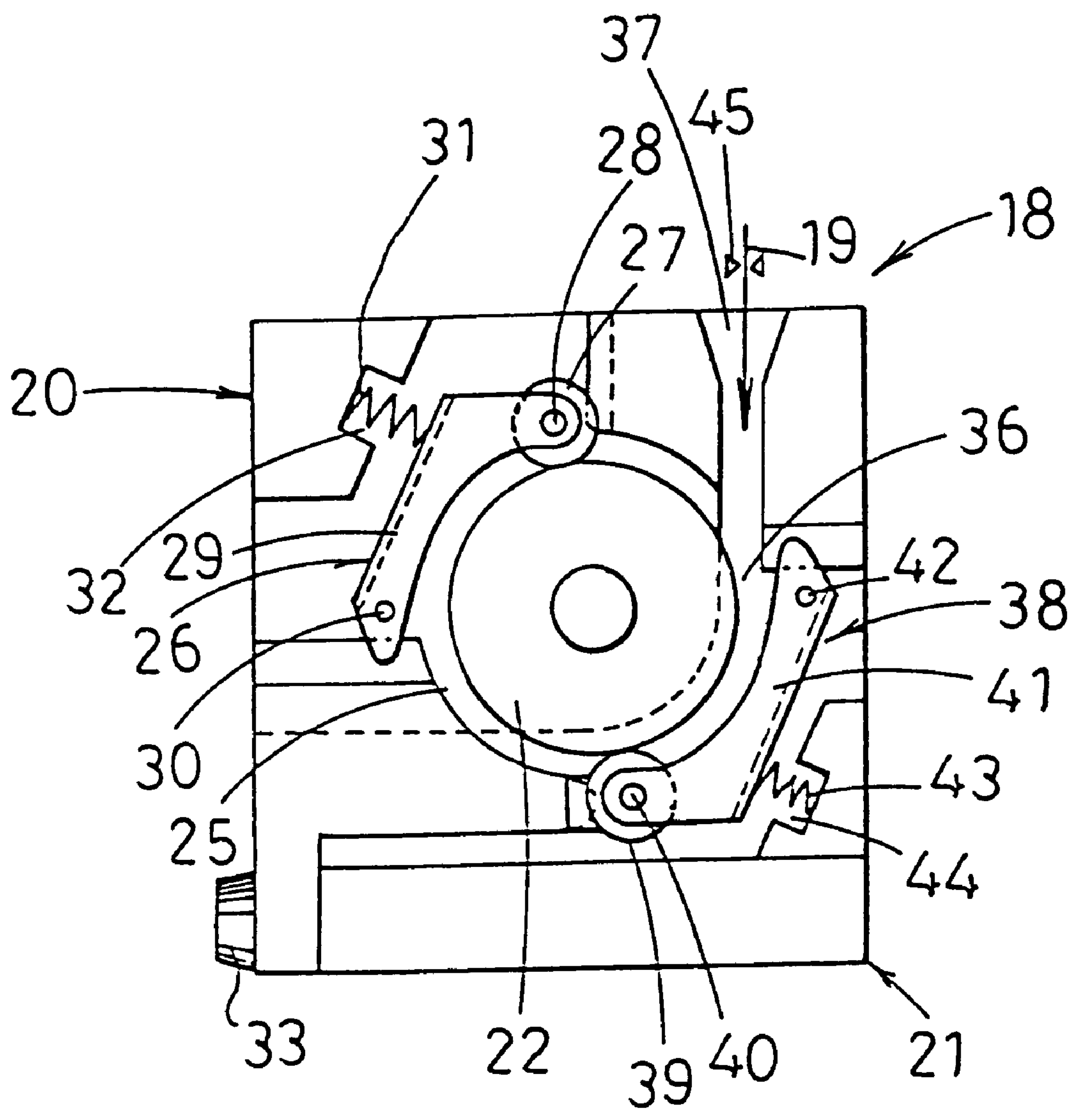
FIG. 3 is an explanatory front view showing an intermediate film takeup cartridge of the present invention.
Figure 4:
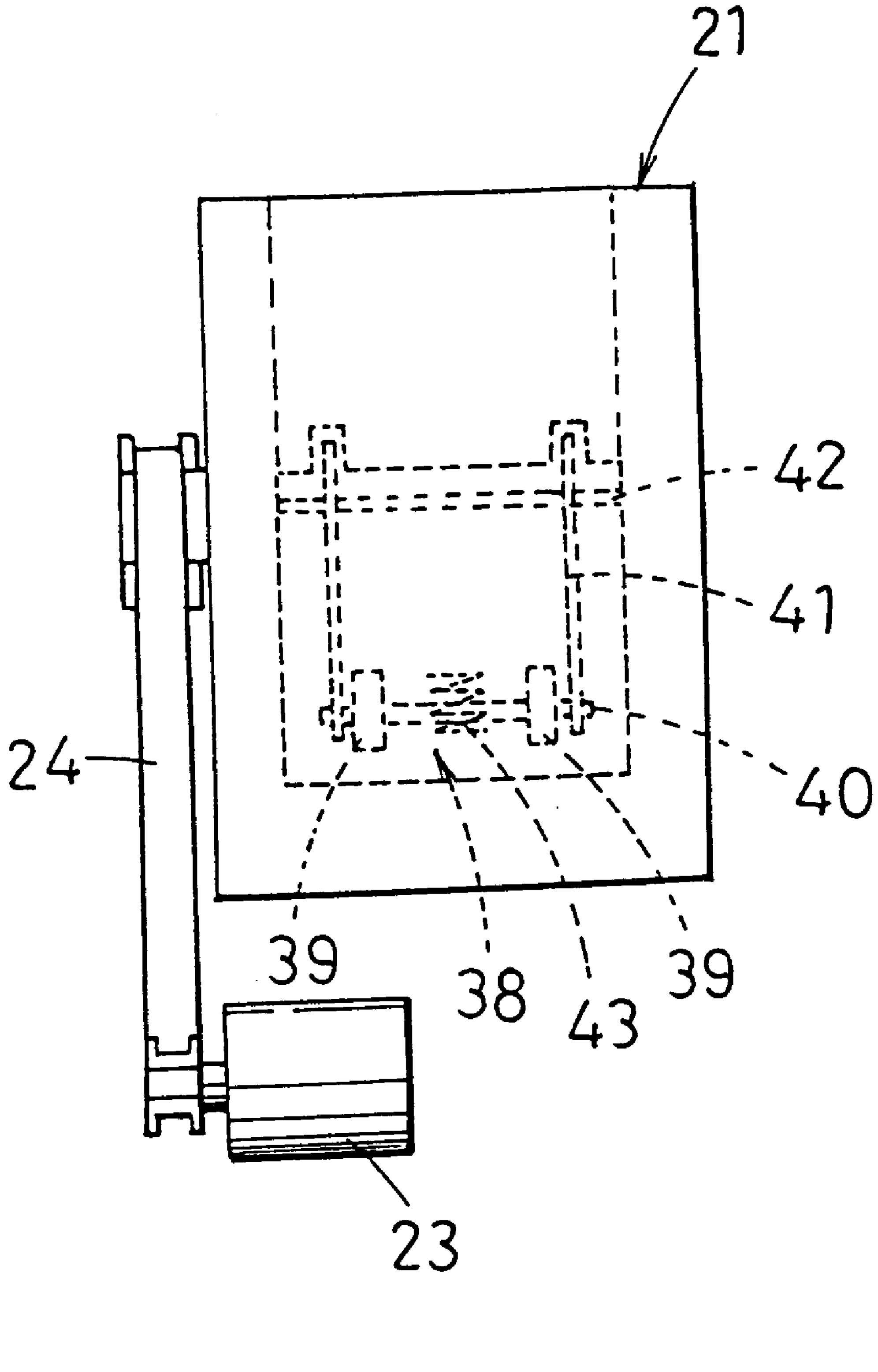
FIG. 4 is a schematic right side view of the intermediate cartridge of FIG. 3 showing a motor and a belt.
Figure 5:
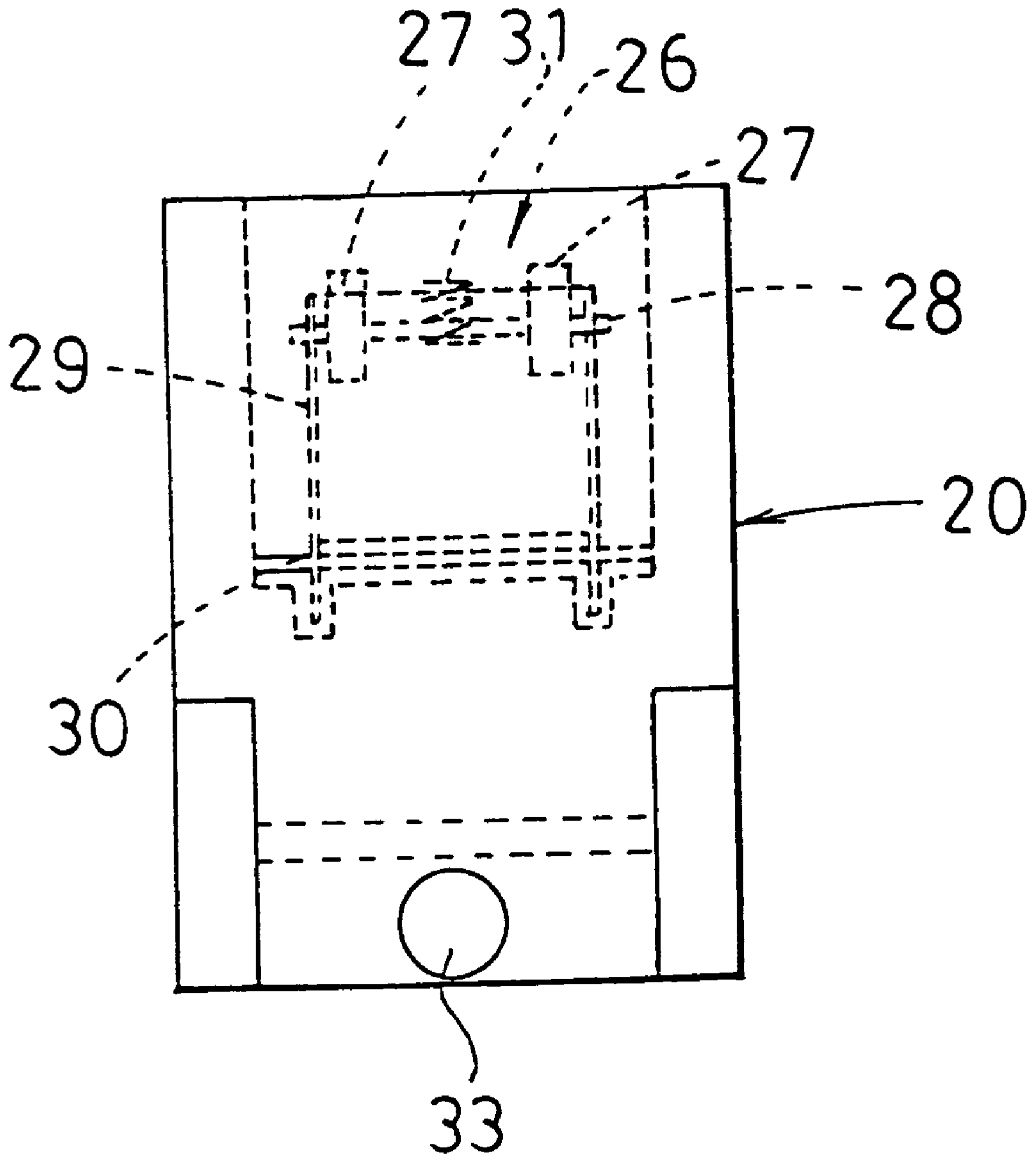
FIG. 5 is a schematic left side view of the intermediate cartridge of FIG. 3.

FIGS. 1 and 2 illustrate an automatic film unloading apparatus 1 according to the present invention, and FIGS. 3 to 6 show an intermediate film takeup cartridge for use in the automatic film unloading apparatus according to the present invention.

As illustrated in FIGS. 1 and 2, the automatic film unloading apparatus 1 of the present invention comprises a film drawing means 2, a light shielding door opening and closing means 3, a film disconnecting means 4, a pair of cases 5, a takeup reel rotating means 6, a case turning means 7, and a taken-up film feeding means 8. Also, denoted by the numeral 9 is a cartridge loaded with a roll of undeveloped film A.

The film drawing means 2 is provided for driving a spool 10 of the film cartridge 9 loaded with the undeveloped film roll A to unload the undeveloped film A from the cartridge 9 and includes a motor 2*a*, a power transmission mechanism 2*b*, and a rotary shaft 2*c* as shown in FIG. 2. The rotary shaft 2*c* is shaped for engagement with a bore (not shown) of the spool 10 of the cartridge 9.

The light shielding door opening and closing means 3 is provided for opening and closing a light shielding door 11 of the cartridge 9 loaded with the undeveloped film A, and includes a motor 3*a*, a power transmission mechanism 3*b*, and a rotary shaft 3*c* as shown in FIG. 2. The rotary shaft 3*c* is shaped for engagement with the light shielding door 11 of the cartridge 9 for opening and closing operations.

The film drawing means 2 and the light shielding door opening and closing means 3 both are mounted on a common movable plate 12 so that their respective rotary shafts 2*c* and 3*c* are engaged with their corresponding holes (not shown) in the cartridge 9 transferred to a specific location in an automatic developer apparatus (not shown) as the movable plate 12 travels.

The film disconnecting means 4 comprises a motor 4*a*, a pulley 4*b* (or a sprocket), a belt 4*c* (or a chain), a pulley 4*d* (or a sprocket), an actuating rod 4*e* fixedly mounted to the pulley 4*d*, and a disconnecting arm 4*f* of an arcuate shape mounted to the distal end of the actuating rod 4*e*.

The film disconnecting means 4 is designed such that the disconnecting arm 4*f* is actuated by the motor 4*a* via the pulley 4*b*, the belt 4*c*, the pulley 4*d*, and the actuating rod 4*e* to move into the cartridge 9 through the light shielding door 11 opened by the light shielding door opening and closing means 3 and engage with an engaging hole (not shown) of the spool 10 to which the trailing end of the undeveloped film A is joined, for disconnecting the undeveloped from A from the spool 10.

The two cases 5 are provided for temporarily storing the undeveloped film A unloaded from the cartridge 9 and are connected to each other by a link bar 15. When the two cases 5 are turned 180 degrees, the exit 14*a* of a guide passage 14 from the light shielding door 11 of the cartridge 9 comes opposite to a film outlet 13 of one of the two cases 5 for the undeveloped film A and a film outlet 13 of the other case 5 comes to a location where the undeveloped film A in the other case 5 is joined to a film leader 17. Each of the cases 5 contains a takeup reel 5*a* for rewinding the undeveloped film A, a leaf spring 5*b*, and a holddown roller 5*c*.

The takeup reel 5*a* of the case 5 is driven by the takeup reel rotating means 6 for forward and backward rotations. The takeup reel rotating means 6 comprises a motor 6*a*, a pulley 6*b* (or a sprocket), a belt 6*c* (or a chain), a pulley 6*d* (or a sprocket), a toothed wheel 6*e* mounted coaxially of the pulley 6*d*, and another toothed wheel 6*f* meshed with the toothed wheel 6*e* and also with a toothed wheel 6*g* mounted on the takeup reel 5*a* of the case 5.

As the motor 6*a* is actuated, the pulley 6*b*, the belt 6*c*, the pulley 6*d*, the toothed wheel 6*e*, the toothed wheel 6*f*, and the toothed wheel 6*g* rotate the takeup reel 5*a* allowing the undeveloped film A unloaded from the cartridge 9 to be rewound on the takeup reel 5*a*.

The two cases 5 are turned by the case turning means 7 which comprises a motor 7*a*, a pulley 7*b* (or a sprocket), a belt 7*c* (or a chain), and a pulley 7*d* (or a sprocket). The pulley 7*d* is fixedly mounted to a support shaft 16 which is joined to the center of the link bar 15 for turning the two cases 5 thereabout.

As the motor 7*a* is actuated, the pulley 7*b*, the belt 7*c*, and the pulley 7*d* rotate to drive the support shaft 16, thus allowing the link bar 15 to turn 180 degrees together with the two cases 5.

The taken-up film feeding means 8 is provided for rotating the takeup reel 5*a* of the case 5 located at the leader joining side to unloading the undeveloped film A from the takeup reel 5*a*.

The taken-up film feeding means 8 comprises a motor 8*a*, a pulley 8*b* (or a sprocket), a belt 8*c* (or a chain), a pulley 8*d* (or a sprocket), a toothed wheel 8*e* mounted coaxially of the pulley 8*d*, and another toothed wheel 8*f* meshed with the toothed wheel 8*e* and also with a toothed wheel 8*g* mounted on the takeup reel 5*a* of the case 5.

As the motor 8*a* is actuated, the pulley 8*b*, the belt 8*c*, the pulley 8*d*, the toothed wheel 8*e*, the toothed wheel 8*f*, and the toothed wheel 8*g* rotate to drive the takeup reel 5*a* allowing the undeveloped film A to be transferred from the takeup reel 5*a* to the film leader 17 for joining thereto.

The operation of the automatic film unloading apparatus 1 of the present invention starts with placing the cartridge 9 loaded with a roll of undeveloped film A in its position shown in FIG. 1, followed by actuation of the light shielding door opening and closing means 3 and the film unloading means 2 to open the light shielding door 11 of the cartridge 9 and to rotate the spool 10 of the cartridge 9, hence permitting the undeveloped film A to be unloaded from the cartridge 9 and rewound in one of the two cases 5.

More specifically, the leading end of the undeveloped film A from the cartridge 9 is fed to and rewound on the takeup reel 5*a* of the case 5 by the operation of the takeup reel rotating means 6.

When the undeveloped film A has nearly been rewound on the takeup reel 5*a*, the film disconnecting means 4 is actuated so that its disconnecting arm 4*f* moves into the cartridge 9 and disconnects the trailing end of the undeveloped film A from the spool 10. The undeveloped film A upon being disconnecting from the spool 10 of the cartridge 9 is rewound on to the takeup reel 5*a* of the case 5. When the undeveloped film A has been disconnected from the spool 10, the film disconnecting means 4 stops its movement and the disconnecting arm 4*f* is returned to an original position. This is followed by ceasing operation of the related means 2, 3, and 6.

As the case 5 has been loaded with the undeveloped film A, the case turning means 7 is actuated to turn the case 5 through 180 degrees up to the location where the film leader 17 stands by. Simultaneously, the other case 5 is turned to move from the film leader location to the unloading location where the unloaded film A is received from the cartridge 9.

The case 5 upon arriving at the film leader location is unloaded by the operation of the taken-up film feeding means 8 so that the trailing end of the undeveloped film A on the takeup reel 5*a* is released and joined to engaging holes (not shown) of the film leader 17.

Accordingly, the undeveloped film A in the cartridge 9 can automatically be unloaded and rewound in one of the two cases 5 which is then turned to the location where the film leader 17 stands by.

The above procedure may be executed with two or more undeveloped films A being unloaded at a time from their respective cartridges 9 disposed in parallel and joined to the film leader 17 at the joining location.

Embodiment 2

An intermediate film takeup cartridge according to the present invention for use in an automatic film developer apparatus will be described referring to FIGS. 3 to 6.

The intermediate film takeup cartridge denoted by 18 is installed in an automatic film developer apparatus for temporarily storing a sheet of developed film 19 unloaded from its cartridge (not shown).

Figure 6:
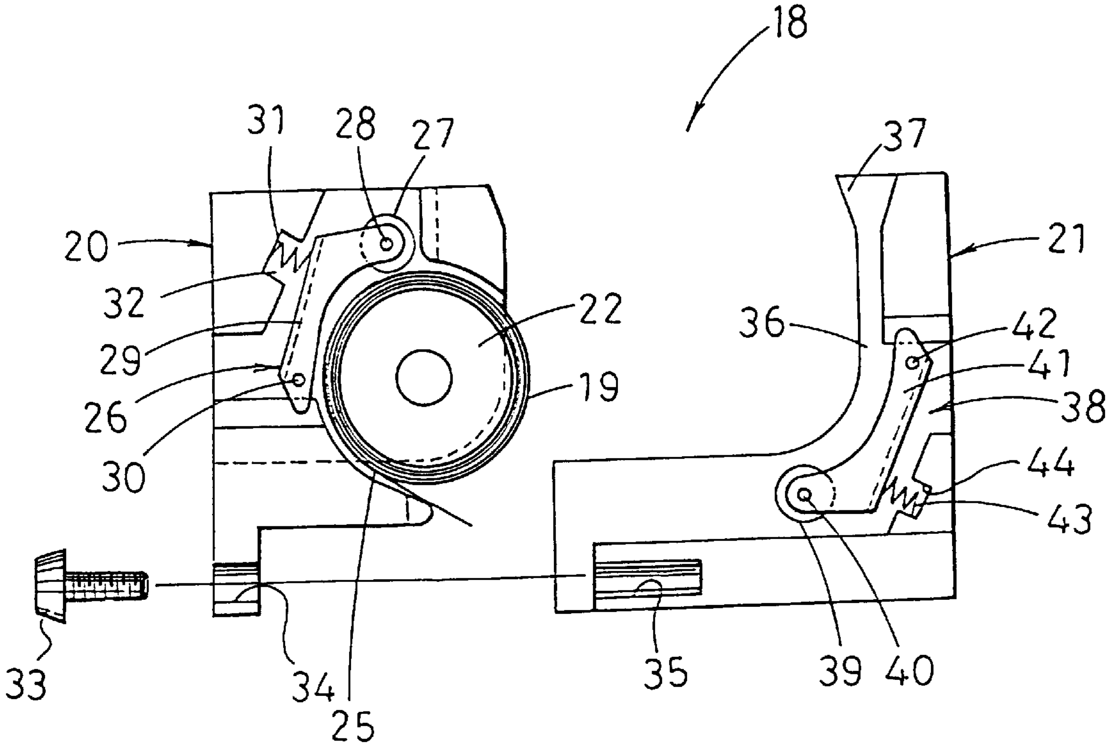
FIG. 6 is an explanatory view showing an intermediate cartridge body and a base of the intermediate film takeup cartridge of the present invention separated from each other.

The intermediate cartridge 18 comprises two main sections, i.e. an intermediate cartridge body 20 and a base 21 (see FIG. 6).

The intermediate cartridge body 20 includes a film takeup roller 22 rotatably mounted thereon and connected by a belt 24 to a motor 23 (FIG. 4) located on the automatic film developer apparatus (not shown).

The intermediate cartridge body 20 includes a film guide passage 25 thereof extending along the outer surface of the film takeup roller 22 and a guide member 26 for guiding a sheet of undeveloped film 19 rewound on the film takeup roller 22.

The guide member 26 (FIGS. 3 and 5) comprises two rollers 27, a roller shaft 28, a support bracket 29, a bracket pivot shaft 30, and a spring 31. The support bracket 29 is pivotably mounted on the bracket pivot shaft 30 adjacent to the guide passage 25 in the intermediate cartridge body 20. The roller shaft 28 is rotatably mounted in parallel to the bracket pivot shaft 30 on the distal end of the support bracket 29 and the two rollers 27 are mounted close to operation end regions of the roller shaft 28. One end of spring 31 is mounted close to a distal end region of the back of the support bracket 29 and at the other end of springs 31 is in a recess 32 provided in the intermediate cartridge body 20. The spring 31 remains urging the support bracket 29 against the film takeup roller 22 so that the two rollers 27 on the roller shaft 28 of the support bracket 29 project across the film guide passage 25 and come into direct contact with the outer surface of the film takeup roller 22.

The base 21 (FIGS. 3 and 4) is arranged for joining with and separating from the intermediate cartridge body 20. The joining of the base 21 with the intermediate cartridge body 20 is by means of a retaining screw 33 inserted in a through hole 34 (FIG. 6) provided in the lowermost portion of the intermediate cartridge body 20 and threaded into a screw bore 35 provided in the lowermost portion of the base 21.

The base 21 has a film introduction passage 36 therein which extends along the outer surface of the film takeup roller 22 and is communicated at one end with the film guide passage 25 of the intermediate cartridge body 20. The film introduction passage 36 is also communicated at the other end thereof with a film takeup inlet 37 provided in the uppermost portion of the base 21. This allows the undeveloped film 19 unloaded from its cartridge (not shown) to be passed through the film takeup inlet 37 and fed into the intermediate cartridge 18.

Provided in an intermediate portion of the film introduction passage 36 of the base 21 is a guide member 38 which is identical in construction to the guide member 26 of the intermediate cartridge body 20. The guide member 38 comprises two rollers 39, a roller shaft 40, and a support bracket 41, a bracket pivot shaft 42, and a spring 43.

The support bracket 41 is pivotably mounted on the bracket pivot shaft 42 in the base 21. The roller shaft 40 is rotatably mounted in parallel to the bracket pivot shaft 42 on the distal end of the support bracket 41. The two rollers 39 are mounted close to opposite end regions of the roller shaft 40.

The spring 43 for urging the support bracket 41 has one end close to distal end region of the back of the support bracket 41 and another end in a recess 44 provided in the base 21. The spring 43 remains urging the support bracket 41 so that the two rollers 39 come into direct contact with the film takeup roller 22. A sensor 45 (FIG. 3) is provided adjacent to the film takeup inlet 37 for detecting the introduction of the undeveloped film 19 into the intermediate film takeup cartridge 18.

For installation of the intermediate film takeup cartridge 18, the intermediate cartridge body 20 and the base 21 are joined by the retaining screw 33 to each other and placed at a predetermined position in the automatic film developer apparatus (not shown) with the belt 24 mounted between the film takeup roller 22 and the motor 23.

Operation of the automatic film developer apparatus starts with the undeveloped film 19 being automatically unloaded from its cartridge and fed to the intermediate film takeup cartridge 18. The undeveloped film 19 is detected by the sensor 45 before the film takeup inlet 37 of the intermediate cartridge 18. In response, the motor 23 is actuated to rotate the belt 24 and the film takeup roller 22. As the undeveloped film 19 moves in the film introduction passage 36, it is pressed down by the rollers 39 of the guide member 38 against the film takeup roller 22. The undeveloped film 19 is further advanced to the film guide passage 25 of the intermediate cartridge body 20 and pressed down by the rollers 27 of the guide member 26 against the film takeup roller 22. As the film takeup roller 22 rotates, the undeveloped film 19 is rewound on the roller 22. Upon the trailing end of the undeveloped film 19 departing from the sensor 45, the motor 23 is deenergized to stop the rotation of the film takeup roller 22.

If the sensor 45 fails to detect the trailing end of the film, the entire length of the undeveloped film 19 is rewound on the film takeup roller 22. In that case, the retaining screw 33 is unscrewed for separating the intermediate cartridge body 20 from the base 21. Then, the undeveloped film 19 on the film takeup roller 22 of the intermediate cartridge body 20 is exposed and can easily be unloaded in a dark room or the like. This allows the undeveloped film 19 to be removed easily and readily from the film takeup roller 22 without giving undesired injury or exposure before joining again the intermediate cartridge body 20 to the base 21.

What is claimed is:

1. An automatic film unloading apparatus comprising:

an assembly for opening and closing a light shielding door of a film cartridge loaded with a roll of undeveloped film at a film unloading station;

a film unloading assembly for rotating a spool of the film cartridge to unwind the film therefrom;

a rotatably mounted case support having mounted thereon plural film cases;

a turning assembly for rotating said case support to move one said film case from said film unloading station to a leader joining station while moving another said film case to said film unloading station;

a takeup reel rotating assembly for rotating a takeup reel of a said film case located at said film unloading station to wind onto said takeup reel the film being unwound from the film cartridge;

a film disconnecting assembly for disconnecting a trailing end of the film being unwound from the film cartridge; and a film feeding assembly for feeding out the film from a said film case located at said leader joining station to enable the thus fed film to be joined to a leader.

2. An apparatus as claimed in claim 1, wherein said case support comprises a rotatable shaft having extending therefrom plural link bars each link bar supporting a respective film case.

3. An apparatus as claimed in claim 2, wherein said turning assembly is operable to rotate said rotatable shaft.

4. An apparatus as claimed in claim 1, wherein said film feeding assembly is operable to feed out the film from said film case located at said leader joining station at the same time that said takeup reel rotating assembly is operable to wind a subsequent film onto said takeup reel of said film case located at said film unloading station.

5. An apparatus as claimed in claim 1, wherein each said film case comprises an intermediate cartridge body and a base, said body including a film takeup roller forming said takeup reel, a film guide passage extending along an outer surface of said film takeup roller, and a guide member for guiding the film, said base including a film introduction passage communicated with said film guide passage, and a guide member for guiding the film, and said body and said base comprising separate assemblies that are connectable to and separable from each other.

* * * * *